United States Patent
Wu (10) Patent No.: US 9,900,191 B2
(45) Date of Patent: Feb. 20, 2018

(54) ETHERNET NETWORK SYSTEM AND METHOD FOR CANCELLING COMMON MODE SIGNAL

(71) Applicant: REALTEK SEMICONDUCTOR CORP., Hsinchu (TW)

(72) Inventor: Chien-Ming Wu, Hsinchu County (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 117 days.

(21) Appl. No.: 14/642,862

(22) Filed: Mar. 10, 2015

(65) Prior Publication Data

US 2015/0263870 A1 Sep. 17, 2015

(30) Foreign Application Priority Data

Mar. 13, 2014 (TW) .............................. 103108992 A (51) Int. Cl.
*H04L 25/08* (2006.01)
*H04L 12/931* (2013.01)
*H01F 38/14* (2006.01)
*H04L 25/02* (2006.01)

(52) U.S. Cl.
CPC ........ *H04L 25/085* (2013.01); *H04L 25/0276* (2013.01); *H04L 49/40* (2013.01); *H01F 2038/143* (2013.01)

(58) Field of Classification Search
None
See application file for complete search history.

(56) References Cited

U.S. PATENT DOCUMENTS

| | | | | |
|---|---|---|---|---|
| 6,492,880 B1* | 12/2002 | Chiappe | .............. | H04L 25/0266 333/22 R |
| 8,693,528 B1* | 4/2014 | Shrestha | .............. | H04L 25/0276 375/219 |
| 2004/0239465 A1* | 12/2004 | Chen | ....................... | H01F 17/00 336/173 |

(Continued)

OTHER PUBLICATIONS

Altera, "Altera High-Definition Multimedia Interface IP Core User Guide", May 4, 2015, https://www.altera.com/en_US/pdfs/literature/ug/archives/ug-hdmi-15.0.pdf.*

*Primary Examiner* — Charles C Jiang
*Assistant Examiner* — George Atkins, Jr.
(74) *Attorney, Agent, or Firm* — Li & Cai Intellectual Property (USA) Office (57) ABSTRACT

An Ethernet network system and method for cancelling common mode signal is disclosed. The Ethernet network system, with a system frequency, utilizes the delay time point of transmitting data so as to suppress frequency spectrum generated by the Ethernet network system. In other words, delay time between a first network data signal and a second network data signal is quarter of a system signal period, delay time between the second network data signal and a third network data signal is quarter of a system signal period, and delay time between the third network data signal and a fourth network data signal is quarter of a system signal period, so as to cancel common mode signals of a first channel and a third channel and cancel common mode signals of a second channel and a fourth channel, wherein the system signal period is corresponding to the system frequency.

20 Claims, 9 Drawing Sheets

(56) References Cited

U.S. PATENT DOCUMENTS

| | | | |
|---|---|---|---|
| 2006/0092677 A1* | 5/2006 | Moussaoui | H02M 7/4826 363/71 |
| 2008/0048779 A1* | 2/2008 | Crawley | H03F 1/26 330/258 |
| 2008/0137759 A1* | 6/2008 | Cai | H04L 25/0266 375/257 |
| 2008/0260050 A1 | 10/2008 | Dupuis | |
| 2009/0213914 A1 | 8/2009 | Dong et al. | |
| 2010/0080100 A1* | 4/2010 | Hosokawa | G11B 7/0906 369/53.35 |
| 2013/0301745 A1 | 11/2013 | Maniktala | |

* cited by examiner

ETHERNET NETWORK SYSTEM AND METHOD FOR CANCELLING COMMON MODE SIGNAL

BACKGROUND OF THE INVENTION

1. Field of the Invention

The instant disclosure relates to an Ethernet network system; in particular, to a method for cancelling common mode signal used in an Ethernet network system.

2. Description of Related Art

The HDMI Ethernet and Audio return Channel (HEAC) are brought to the latest HDMI 4.1 such that the network data signals of the HDMI Ethernet Channel (HEC) and the audio information signals of the Audio Return Channel (ARC) could be transmitted via the HDMI, so as to reduce the complexity of the household network layout lines and to provide single layout line with a great bandwidth and a high quality to transmit complete images and audios and to carry out the Ethernet transmission and the integrated applications of the network multimedia.

With well developed technology, the Internet is applied in more and more aspects. Considering that the required bandwidth of the Internet is increasing, the speed of data packet transmission of the Ethernet which is generally used has been raised from 10/100 Mbps up to over 1 Gbps. Take a common Gigabit Ethernet device for example. In the Gigabit Ethernet device with 1 Gbps transmission speed, each port has four channels. Each channel has a transceiver which communicates with other network devices via a transmission medium such as the twisted pair cable. Each transmission module usually has a transmission terminal and a receiving terminal The transmission terminal processes data and transmits data via a transmission medium to another remote network device, and the receiving terminal receives and processes data transmitted via the transmission medium. According to the standard of the Gigabit Ethernet, each device uses four channels to communicate with other network devices at the time. In other words, the Gigabit Ethernet is a full-duplex communication system.

However, in the prior art, the Ethernet network system transmits data to another remote network device via a transmission medium, and the data are usually transmitted via four channels at the same time. Thus, the working of the inner circuit or the clock generator results in common mode signals, which further generates noises in the differential mode signals and then dramatically decreases the performance and the quality of the network information signals transmitted via Ethernet network channels of the HDMI.

SUMMARY OF THE INVENTION

The instant disclosure provides an Ethernet network system having a system frequency. The Ethernet network system comprises a first transmission module, a primary first inductor, a second transmission module, a primary second inductor, a third transmission module, a primary third inductor, a fourth transmission module and a primary fourth inductor. The first transmission module is configured to transmit a first network data signal via a first channel. The primary first inductor has a first terminal and a second terminal, and the first terminal and the second terminal are electrically connected to the first transmission module so as to receive the first network data signal. The second transmission module is configured to transmit a second network data signal via a second channel. The primary second inductor has a first terminal and a second terminal, and the first terminal and the second terminal are electrically connected to the second transmission module so as to receive the second network data signal. The third transmission module is configured to transmit a third network data signal via a third channel. The primary third inductor has a first terminal and a second terminal, and the first terminal and the second terminal are electrically connected to the third transmission module so as to receive the third network data signal. The fourth transmission module is configured to transmit a fourth network data signal via a fourth channel. The primary fourth inductor has a first terminal and a second terminal, and the first terminal and the second terminal are electrically connected to the fourth transmission module so as to receive the fourth network data signal. Delay time between the first network data signal and the second network data signal is a quarter of a system signal period, delay time between the second network data signal and the third network data signal is a quarter of the system signal period, and delay time between the third network data signal and the fourth network data signal is a quarter of the system signal period. Moreover, the system signal period is corresponding to the system frequency.

In an embodiment of the instant disclosure, phase of a first common mode signal of the first channel and phase of a third common mode signal of the third channel are reversed, and phase of a second common mode signal of the second channel and phase of a fourth common mode signal of the fourth channel are reversed.

In an embodiment of the instant disclosure, a center tap of the primary first inductor and a center tap of the primary third inductor are connected with each other, and a center tap of the primary second inductor and a center tap of the primary fourth inductor are connected with each other.

In an embodiment of the instant disclosure, a center tap of the primary first inductor and a center tap of the primary second inductor are connected with each other, and a center tap of the primary third inductor and a center tap of the primary fourth inductor are connected with each other.

In an embodiment of the instant disclosure, the Ethernet network system further comprises a secondary first inductor, a secondary second inductor, a secondary third inductor, a secondary fourth inductor and a signal port. The secondary first inductor is configured in the first channel so as to receive the first network data signal. The secondary second inductor is configured in the second channel so as to receive the second network data signal. The secondary third inductor is configured in the third channel so as to receive the third network data signal. The secondary fourth inductor is configured in the fourth channel so as to receive the fourth network data signal. The signal port is electrically connected to the secondary first inductor, the secondary second inductor, the secondary third inductor and the secondary fourth inductor respectively via the first, second, third and fourth channels.

The instant disclosure also provides an Ethernet network system having a system frequency. The Ethernet network system having a system frequency comprises a first transmission module, a primary first inductor, a second transmission module and a primary second inductor. The first transmission module is configured to transmit a first network data signal via a first channel. The primary first inductor has a first terminal and a second terminal, and the first terminal and the second terminal are electrically connected to the first transmission module so as to receive the first network data signal. The second transmission module is configured to transmit a second network data signal via a second channel. The primary second inductor has a first terminal and a second terminal, and the first terminal and the second terminal are electrically connected to the second transmission module so as to receive the second network data signal. Frequencies of the first network data signal and the second network data signal are substantially the same, and the first network data signal and the second network data signal have a predetermined phase difference between to each other.

The instant disclosure further provides a method for cancelling common mode signal and the method is used in an Ethernet network system. The Ethernet network system has a system frequency and comprises a first transmission module, a primary first inductor, a second transmission module, a primary second inductor, a third transmission module, a primary third inductor, a fourth transmission module and a primary fourth inductor. The primary first inductor has a first terminal and a second terminal, and the first terminal and the second terminal are electrically connected to the first transmission module. The primary second inductor has a first terminal and a second terminal, and the first terminal and the second terminal are electrically connected to the second transmission module. The primary third inductor has a first terminal and a second terminal, and the first terminal and the second terminal are electrically connected to the third transmission module. The primary fourth inductor has a first terminal and a second terminal, and the first terminal and the second terminal are electrically connected to the fourth transmission module. The method for cancelling common mode signal comprises: transmitting a first network data signal by the first transmission module via a first channel; receiving the first network data signal by the primary first inductor; transmitting a second network data signal by the second transmission module via a second channel; receiving the second network data signal by the primary second inductor; transmitting a third network data signal by the third transmission module via a third channel; receiving the third network data signal by the primary third inductor; transmitting a fourth network data signal by the fourth transmission module via a fourth channel; and receiving the fourth network data signal by the primary fourth inductor. Delay time between the first network data signal and the second network data signal is a quarter of a system signal period, delay time between the second network data signal and the third network data signal is a quarter of the system signal period, and delay time between the third network data signal and the fourth network data signal is a quarter of the system signal period. Thus, common mode signals between the first channel and the third channel could be cancelled, and common mode signals between the second channel and the fourth channel could be cancelled. Moreover, the system signal period is corresponding to the system frequency.

To sum up, in the Ethernet network system and the method for cancelling common mode signal provided by the instant disclosure, because the time points for transmitting network data signals are staggered, the frequency spectrum generated in the Ethernet network system is suppressed, such as odd-numbered frequencies such as 125 MHz, 375 MHz, 625 MHz, 875 MHz . . . , etc. In other words, delay time between the first network data signal and the second network data signal is a quarter of the system signal period, delay time between the second network data signal and the third network data signal is a quarter of the system signal period, and delay time between the third network data signal and the fourth network data signal is a quarter of the system signal period, which results in a cancellation of common mode signals of the first channel and the third channel, and a cancellation of common mode signals of the second channel and the fourth channel.

For further understanding of the instant disclosure, reference is made to the following detailed description illustrating the embodiments and examples of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings. In the drawings, the size and relative sizes of layers and regions may be exaggerated for clarity.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the instant disclosure. As used herein, the term "and/or" includes any and all combinations of one or more of the associated listed items.

In the following instruction, there are a plurality of embodiments with figures used for describing the Ethernet network system and the method for cancelling common mode signal provided by the instant disclosure; however, it is not restricted thereto.

[One Embodiment of an Ethernet Network System]

Figure 1:
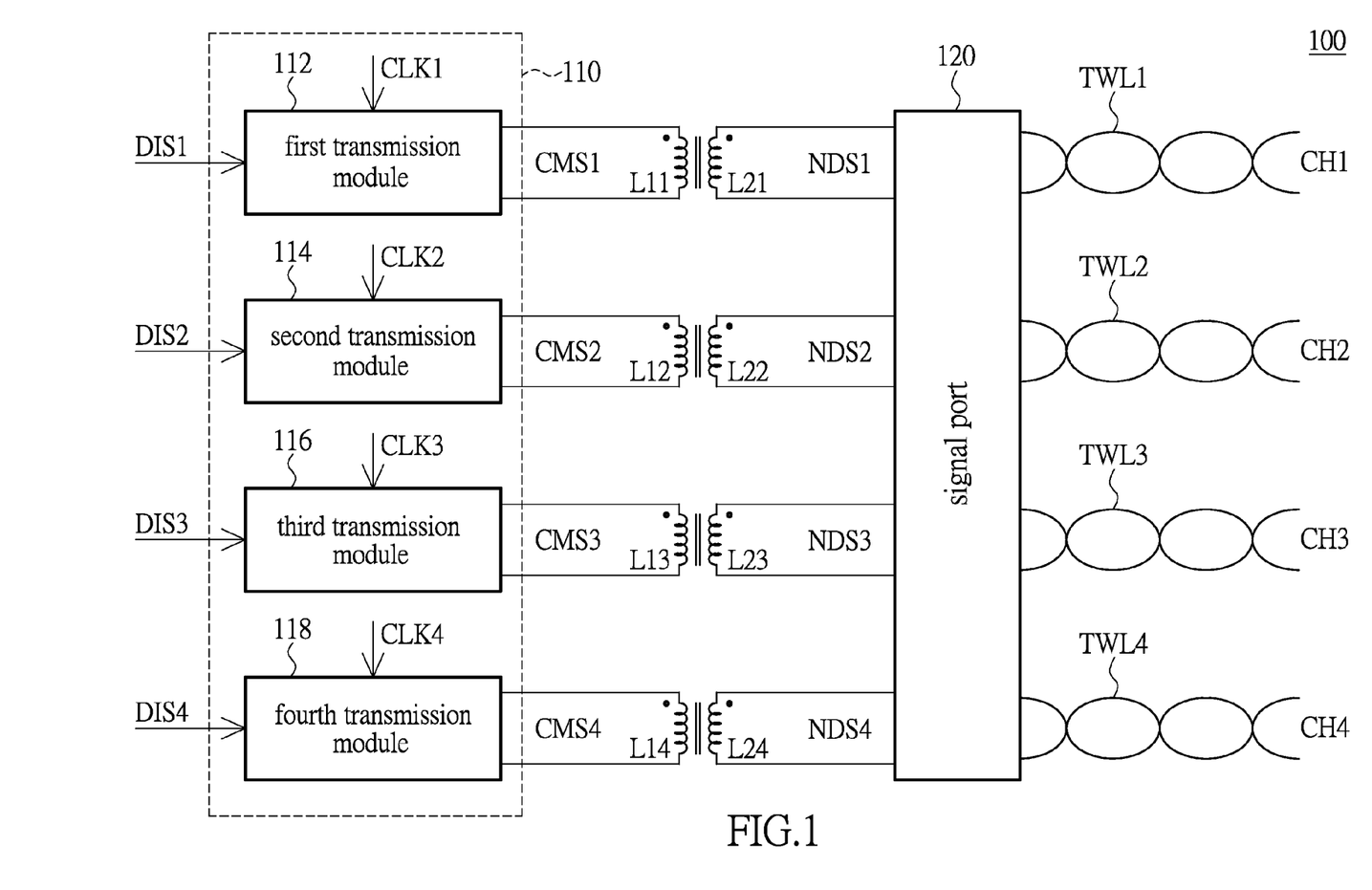
FIG. 1 shows a block diagram of an Ethernet network system according to an embodiment of the instant disclosure.

Please refer to FIG. 1. FIG. 1 shows a block diagram of an Ethernet network system according to an embodiment of the instant disclosure. As shown in FIG. 1, the Ethernet network system 100 comprises a transmission unit 110, a primary first inductor L11, a primary second inductor L12, a primary third inductor L13, a primary fourth inductor L14, a secondary first inductor L21, a secondary second inductor L22, a secondary third inductor L23, and a secondary fourth inductor L24. The transmission unit 110 comprises a first transmission module 112, a second transmission module 114, a third transmission module 116 and a fourth transmission module 118. There is a mutual induction generated between the primary first inductor L11 and the secondary first inductor L21. There is a mutual induction generated between the primary second inductor L12 and the secondary second inductor L22. There is a mutual induction generated between the primary third inductor L13 and the secondary third inductor L23. There is a mutual induction generated between the primary fourth inductor L14 and the secondary fourth inductor L24.

The first transmission module 112 is configured to transmit a first network data signal NDS1 via a first channel CH1. A first terminal and a second terminal of the primary first inductor L11 are electrically connected to the first transmission module 112 so as to receive the first network data signal NDS1. The second transmission module 114 is configured to transmit a second network data signal NDS2 via a second channel CH2. A first terminal and a second terminal of the primary second inductor L12 are electrically connected to the second transmission module 114 so as to receive the second network data signal NDS2. The third transmission module 116 is configured to transmit a third network data signal NDS3 via a third channel CH3. A first terminal and a second terminal of the primary third inductor L13 are electrically connected to the third transmission module 116 so as to receive the third network data signal NDS3. The fourth transmission module 118 is configured to transmit a fourth network data signal NDS4 via a fourth channel. The network data signals NDS1~NDS4 are differential mode signals. A first terminal and a second terminal of the primary fourth inductor L14 are electrically connected to the fourth transmission module 118 so as to receive the fourth network data signal NDS4. There is a dotting respectively at the first terminals of the primary first inductor L11, the primary second inductor L12, the primary third inductor L13 and the primary fourth inductor L14. Moreover, regarding to the secondary side of the Ethernet network system 100, the secondary first inductor L21 is configured in the first channel CH1 and to receive the first network data signal NDS1. The secondary second inductor L22 is configured in the second channel CH2 and to receive the second network data signal NDS2. The secondary third inductor L23 is configured in the third channel CH3 and to receive the third network data signal NDS3. The secondary fourth inductor L24 is configured in the fourth channel CH4 and to receive the fourth network data signal NDS4. It should be noticed that, the secondary first inductor L21, the secondary second inductor L22, the secondary third inductor L23 and the secondary fourth inductor L24 are electrically connected to the signal port 120 respectively via the first channel, the second channel, the third channel and the fourth channel CH1~CH4. Also, another terminal of the signal port 120 is respectively connected with the transmission lines TWL1~TWL4 (as the transmission media) to communicate with other network devices wherein the transmission lines may be, for example, the twisted pair cable. In addition, there is a dotting respectively at the first terminals of the secondary second inductor L21, the secondary second inductor L22, the secondary third inductor L23 and the secondary fourth inductor L24.

In the following description is further instruction in teaching a work mechanism of the Ethernet network system 100.

In the instant disclosure, the Ethernet network system has a system frequency (such as 125 MHz), and it also can be described that the Ethernet network system has a system signal period which is 8 ns. The Ethernet network system 100 makes phases of the common mode signals of the first channel CH1 and the third channel CH3 reverse and makes phases of the common mode signals of the second channel CH2 and the fourth channel CH4 reverse via delaying the transmission of network data signals NDS1~NDS4, which further results in cancellation of the common mode signals. Furtheii lore, when an electronic device (not shown) is connected to the Ethernet network system 100, the first transmission module 112 transmits the first network data signal NDS1 according to the received first clock signal CLK1. The second transmission module 114 transmits the second network data signal NDS2 according to the received second clock signal CLK2. The third transmission module 116 transmits the third network data signal NDS3 according to the third clock signal CLK3. The fourth transmission module 118 transmits the fourth network data signal NDS4 according to the fourth clock signal CLK4. It should be noticed that, phases of the clock signals CLK1~CLK4 are staggered respectively by a quarter of the system signal period. In other words, phase of the first clock signal CLK1 leads phase of the second clock signal CLK2 by about a quarter of the system signal period (such as 2 ns), phase of the second clock signal CLK2 leads phase of the third clock signal CLK3 by about a quarter of the system signal period (such as 2 ns), and phase of the third clock signal CLK3 leads phase of the fourth clock signal CLK4 by about a quarter of the system signal period (such as 2 ns). Accordingly, time points for transmitting the network data signals NDS1~NDS4 by the transmission modules 112~114 are respectively staggered by a quarter of the system signal period (such as 2 ns). In other words, delay time between the network data signals NDS1 and NDS2 are a quarter of the system signal period (such as 2 ns), delay time between the network data signals NDS2 and NDS3 are a quarter of the system signal period (such as 2 ns), and delay time between the network data signals NDS3 and NDS4 are a quarter of the system signal period (such as 2 ns). Thus, phases of the common mode signals CMS1 and CMS3 of the first channel CH1 and the third channel CH3 are reversed and thus the common mode signals CMS1 and CMS3 are mutually cancelled, and phases of the common mode signals CMS2 and CMS4 of the second channel CH2 and the fourth channel CH4 are reversed and thus the common mode signals CMS2 and CMS4 are mutually cancelled. It is worth mentioning that, in the topology architecture of the Ethernet network system 100 shown in FIG. 1, common mode signals are cancelled via the magnetic cancellation.

For a specific instruction on an operation process of the Ethernet network system 100 of the instant disclosure, there is at least one of the embodiments for further instruction.

In the following embodiments, there are only parts different from embodiments in FIG. 1 described, and the omitted parts are indicated to be identical to the embodiments in FIG. 1. In addition, for an easy instruction, similar reference numbers or symbols refer to elements alike.

In the following description is further instruction in cancelling common mode signals via the electric cancellation in two topology architectures of the Ethernet network system.

[Another Embodiment of the Ethernet Network System]

Figure 2:
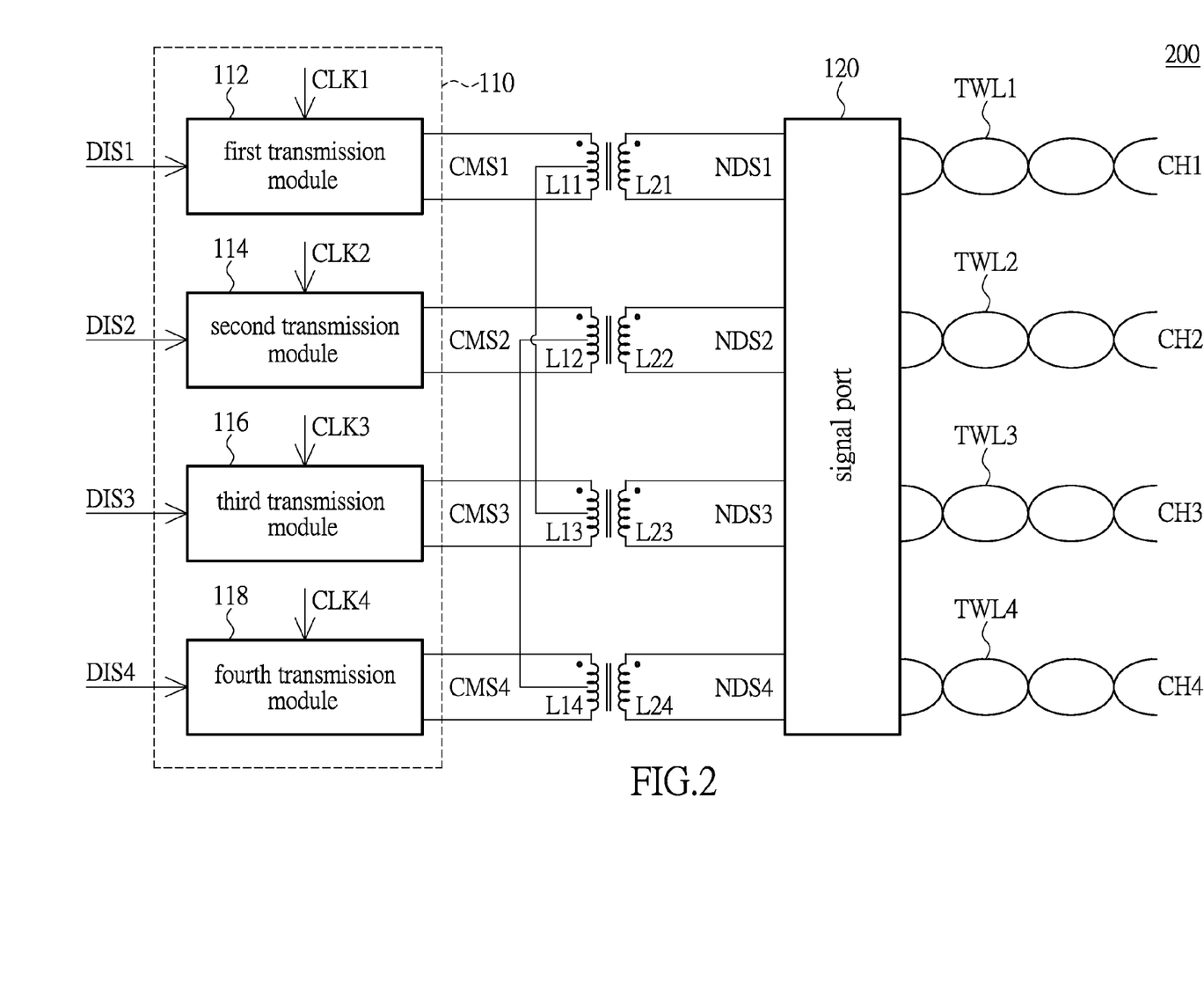
FIG. 2 shows a frame schematic diagram of an Ethernet network system according to another embodiment of the instant disclosure.
Figure 3:
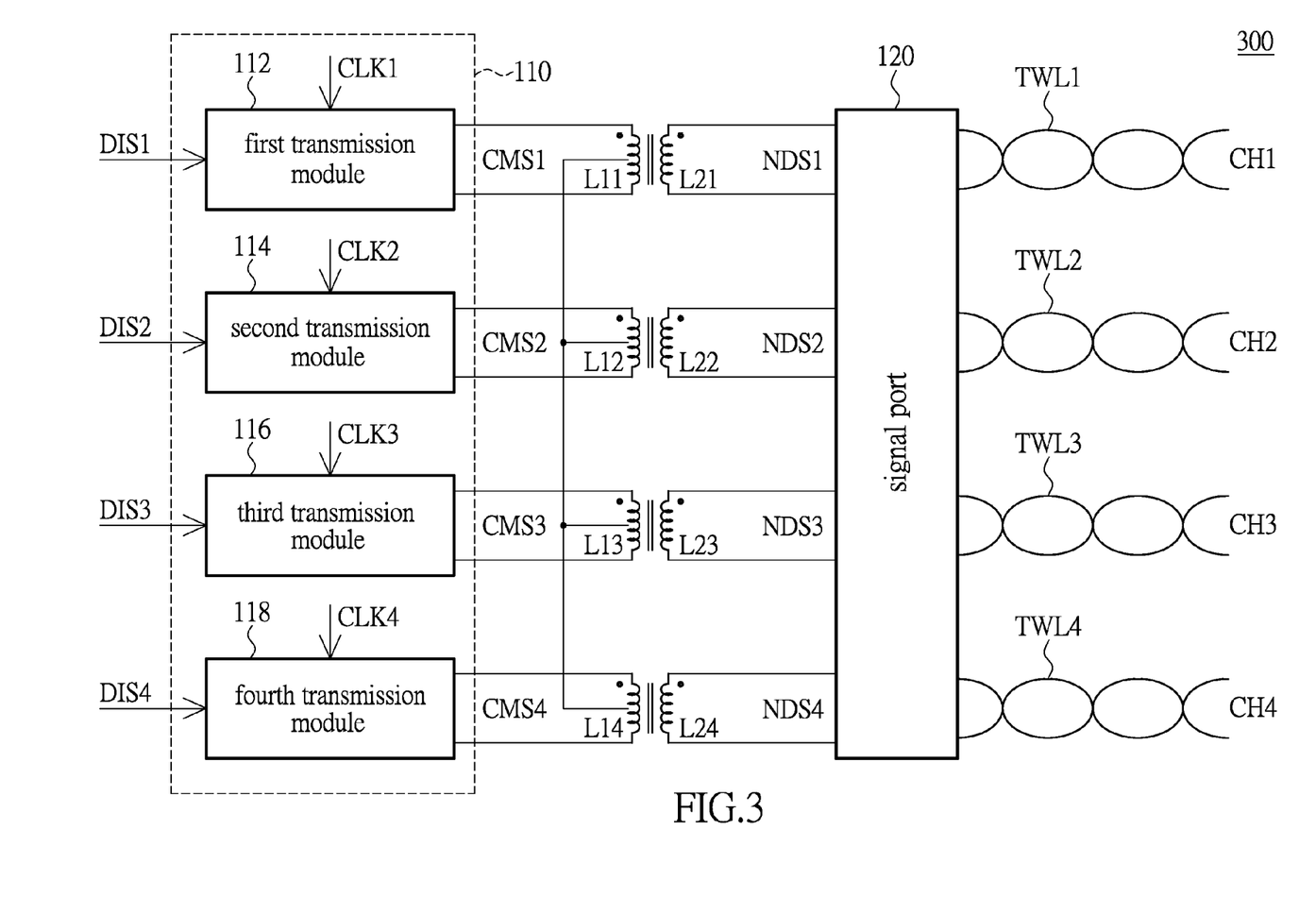
FIG. 3 shows a frame schematic diagram of an Ethernet network system according to still another embodiment of the instant disclosure.

Please refer to FIG. 2. FIG. 2 shows a frame schematic diagram of an Ethernet network system according to another embodiment of the instant disclosure. Different from the embodiment shown in FIG. 1, in the Ethernet network system 200 of the present embodiment, a center tap of the primary first inductor L11 and a center tap of the primary third inductor L13 are connected with each other so as to form a short circuit, and a center tap of the primary second inductor L12 and a center tap of the primary fourth inductor L14 are connected with each other so as to form a short circuit. Accordingly, phase of the first common mode signal CMS1 of the first channel CH1 and phase of the third common mode signal CMS3 of the third channel CH3 are reversed so as to foil a great reverse match, and phase of the second common mode signal CMS2 of the second channel CH2 and phase of the fourth common mode signal CMS4 of the fourth channel CH4 are reversed so as to form a great reverse match. In another embodiment, please refer to FIG. 3, FIG. 3 shows a frame schematic diagram of an Ethernet network system according to still another embodiment of the instant disclosure. Different from the embodiment shown in FIG. 1, in the Ethernet network system 300 of the present embodiment, center taps of the primary first inductor L11, the primary second inductor L12, the primary third inductor L13 and the primary fourth inductor L14 are connected with one another so as to form a short circuit such that there would be a better reverse match between the first common mode signal CMS1 and the third common mode signal CMS3, and between the second common mode signal CMS2 and the fourth common mode signal CMS4.

In the following description is further instruction in teaching a work mechanism of the Ethernet network system 300.

Figure 4:
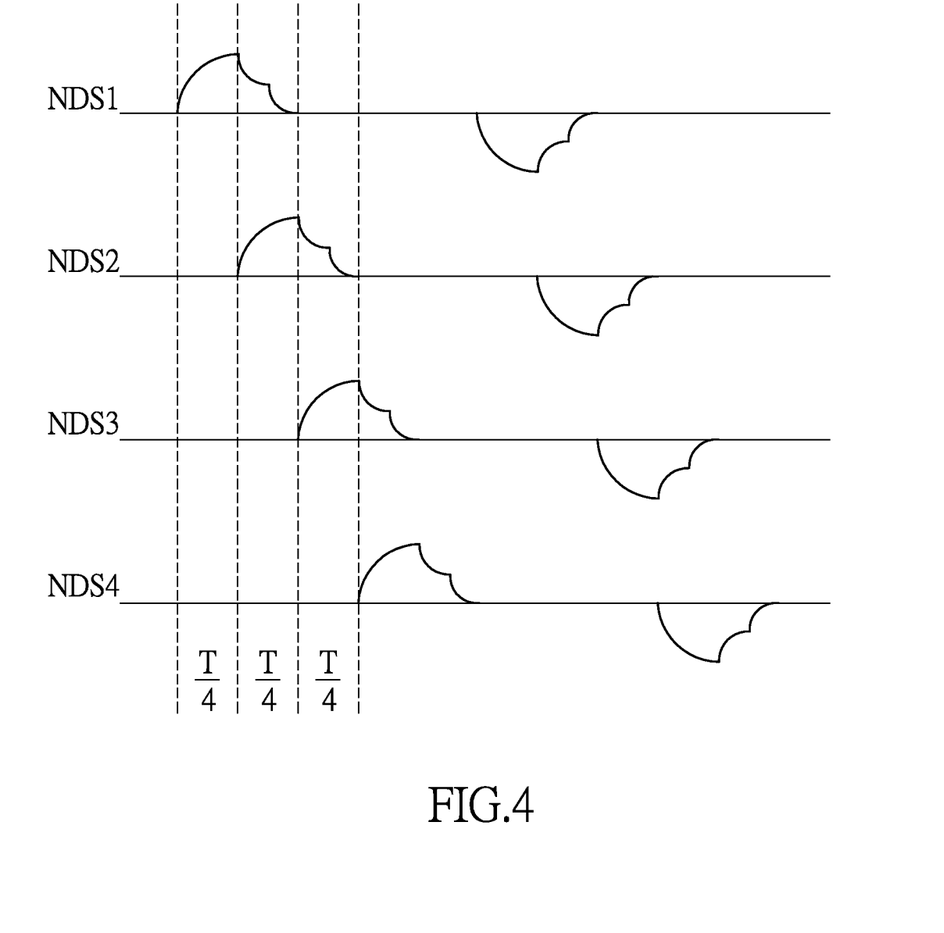
FIG. 4 shows a waveform diagram of a network data signal according to an embodiment of the instant disclosure.
Figure 5:
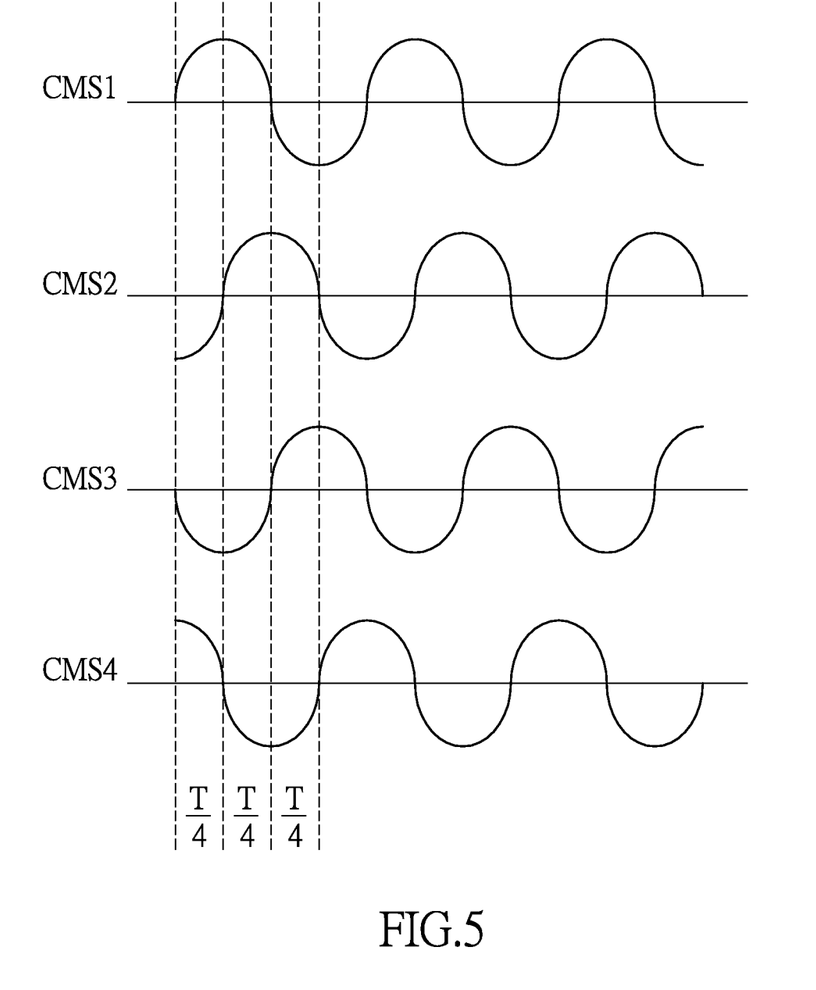
FIG. 5 shows a waveform diagram of a common mode signal according to an embodiment of the instant disclosure.

In conjunction with FIG. 3, FIG. 4 and FIG. 5, FIG. 4 shows a waveform diagram of a network data signal according to an embodiment of the instant disclosure, and FIG. 5 shows a waveform diagram of a common mode signal according to an embodiment of the instant disclosure. When an electronic device (not shown) is connected to the Ethernet network system 300, the clock signals CLK1~CLK4 sequentially sample the digital information signals DIS1~DIS4 respectively with a time interval therebetween (that is, the delay time) which is a quarter of the system signal period T. Thus, the transmission modules 112, 114, 116 and 118 respectively output the network data signals NDS1~NDS4 with a phase difference of a quarter of the system signal period T between one another (such as 2 ns) (as shown in FIG. 4). Moreover, the clock signals CLK1~CLK4 sequentially sample the digital information signals DIS1~DIS4 respectively with a time interval therebetween (that is, the delay time) which is a quarter of the system signal period T, so phases of the common mode signals CMS1~CMS4 generated from the first channel CH1, the second channel CH2, the third channel CH3 and the fourth channel CH4 would be delayed by a quarter of the system signal period T after another (such as 2 ns), as shown in FIG. 5. Furthermore, because phases of the first common mode signal CMS1 and the third common mode signal CMS3 are entirely reversed, they would be cancelled by each other, and because phases of the second common mode signal CMS2 and the fourth common mode signal CMS4 are entirely reversed, they would be cancelled by each other.

Therefore, in the Ethernet network system 300, time points for transmitting the network data signals NDS1~NDS4 are staggered so as to suppress the frequency spectrum generated from the Ethernet network system 300 via the electric cancellation, such as odd-numbered frequencies of 125 MHz (125 MHz, 375 MHz, 625 MHz, 875 MHz . . . , etc). Moreover, noises in the differential mode signals could be reduced in the Ethernet network system 300 so as to improve the performance and quality of the network data signals in the Ethernet network system.

In the following embodiments, there are only parts different from embodiments in FIG. 1 described, and the omitted parts are indicated to be identical to the embodiments in FIG. 1. In addition, for an easy instruction, similar reference numbers or symbols refer to elements alike.

In the following description is further instruction in cancaelling common mode signals via the electric cancellation in other two topology architectures of the Ethernet network system.

[Still Another Embodiment of the Ethernet Network System]

Figure 6:
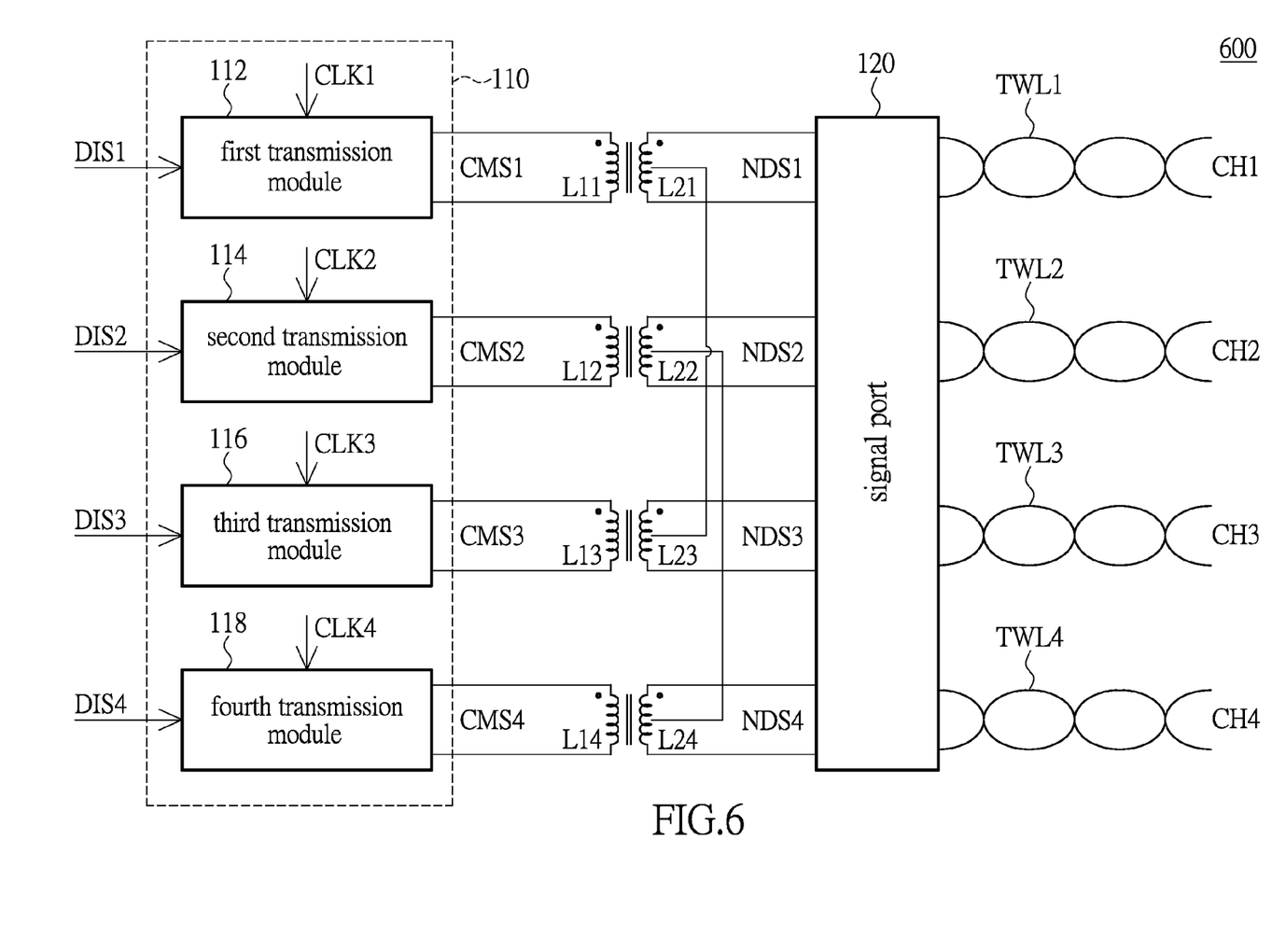
FIG. 6 shows a block diagram of an Ethernet network system according to an embodiment of the instant disclosure.
Figure 7:
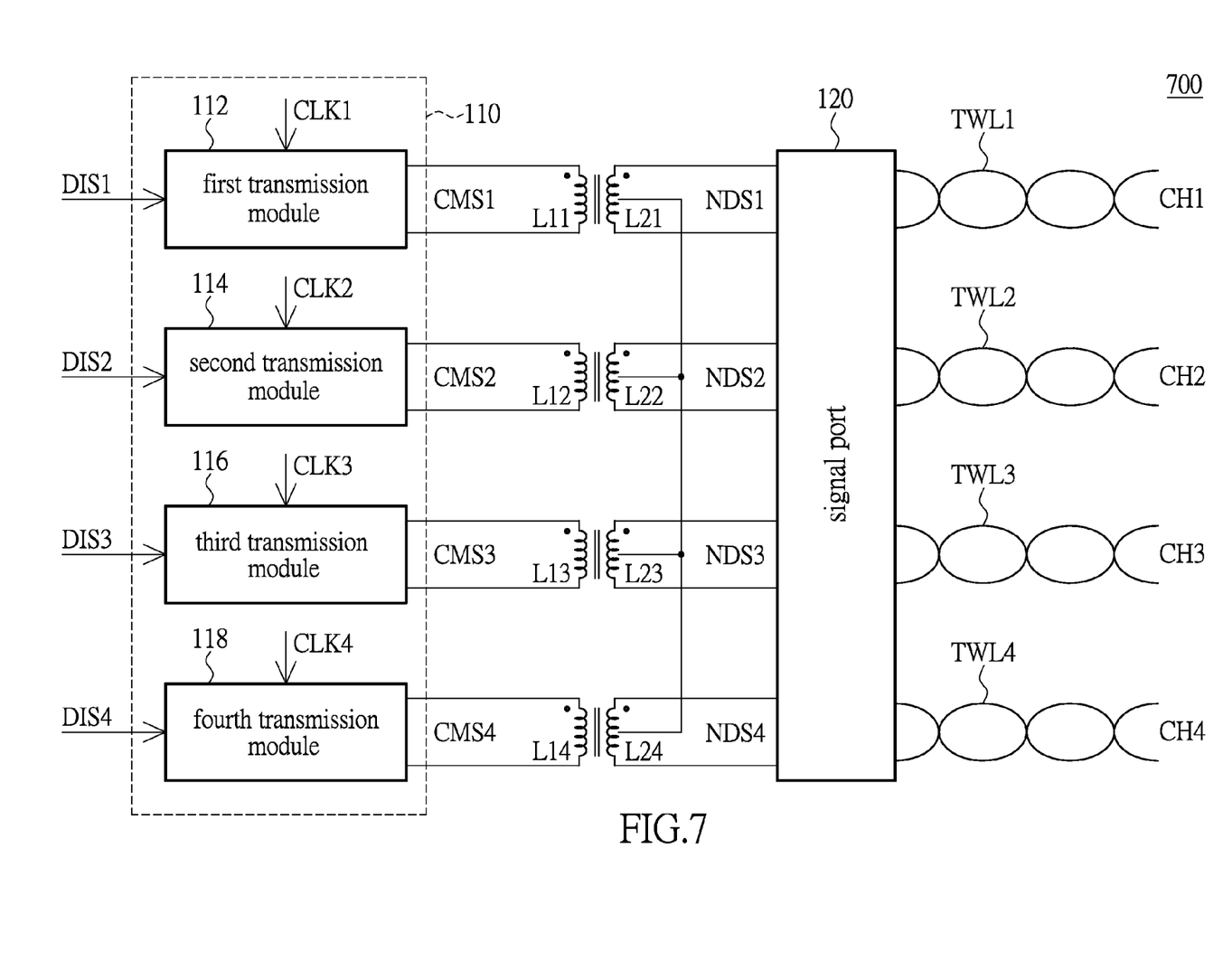
FIG. 7 shows a frame schematic diagram of an Ethernet network system according to another embodiment of the instant disclosure.

Please refer to FIG. 6. FIG. 6 shows a block diagram of an Ethernet network system according to an embodiment of the instant disclosure. Different from the embodiment shown in FIG. 1, in the Ethernet network system 600 of the present embodiment, a center tap of the secondary first inductor L21 and a center tap of the secondary third inductor L23 are connected with each other so as to form a short circuit, and a center tap of the secondary second inductor L22 and a center tap of the secondary fourth inductor L24 are connected with each other so as to form a short circuit. Therefore, phase of the first common mode signal CMS1 of the first channel CH1 and phase of the third common mode signal CMS3 of the third channel CH3 are reversed so as to form a great reverse match therebetween, and phase of the second common mode signal CMS2 of the second channel CH2 and phase of the fourth common mode signal CMS4 of the fourth channel CH4 are reversed so as to form a great reverse match therebetween. In another embodiment, please refer to FIG. 7, FIG. 7 shows a frame schematic diagram of an Ethernet network system according to another embodiment of the instant disclosure. Different from the embodiment shown in FIG. 1, in the Ethernet network system 700 of the present embodiment, center taps of the secondary first inductor L21, the secondary second inductor L22, the secondary third inductor L23 and the secondary fourth inductor L24 are connected with one another so as to form a short circuit. Thus, there would be a better reverse match between the first common mode signal CMS1 and the third common mode signal CMS3 and between the second common mode signal CMS2 and the fourth common mode signal CMS4. The rest of the work mechanism is identical to the embodiments recited above, and it is not repeated thereto.

In the following embodiments, there are only parts different from embodiments in FIG. 3 described, and the omitted parts are indicated to be identical to the embodiments in FIG. 3. In addition, for an easy instruction, similar reference numbers or symbols refer to elements alike.

[Still Another of the Ethernet Network System]

Figure 8:
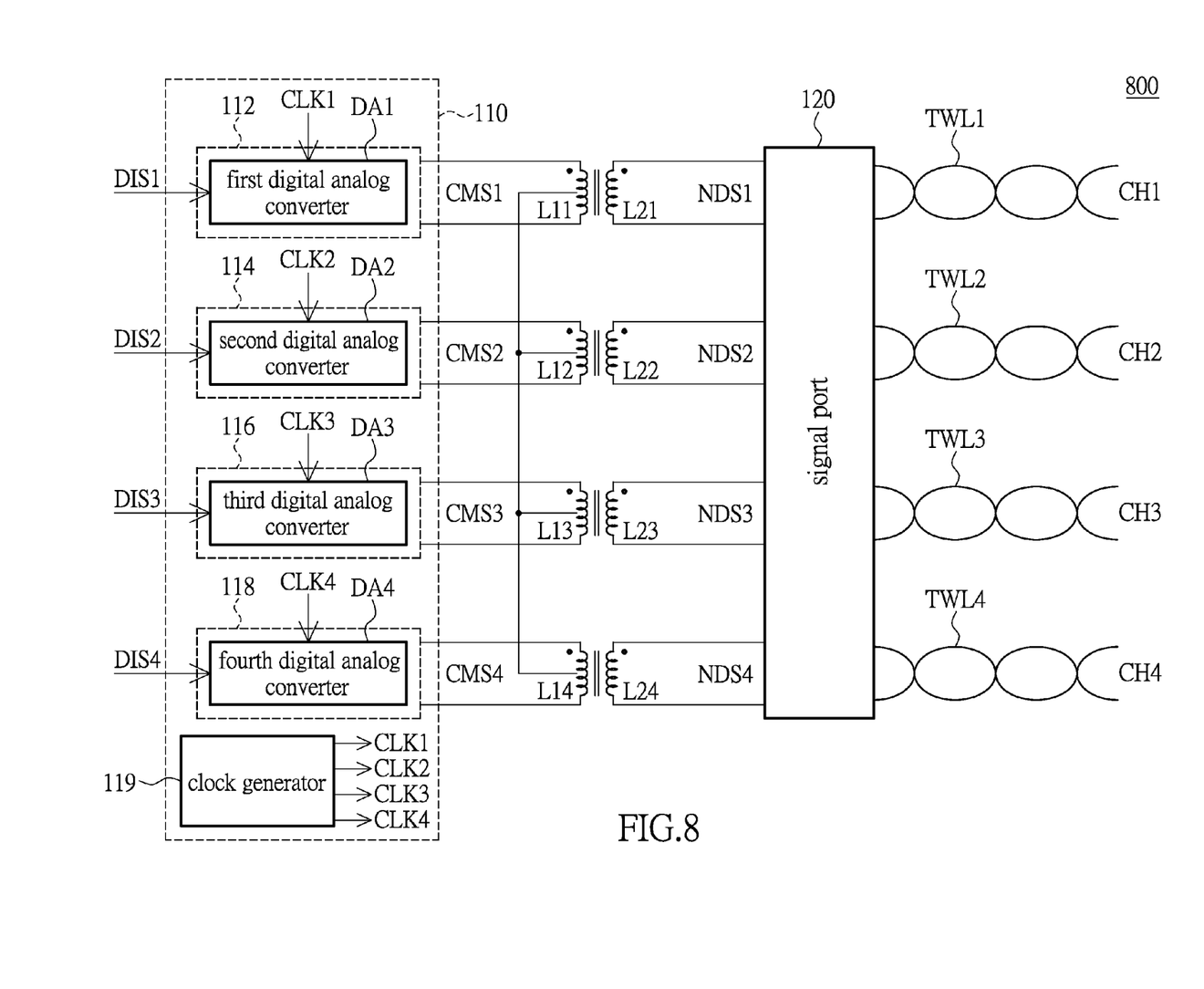
FIG. 8 shows a block diagram of an Ethernet network system according to an embodiment of the instant disclosure.

Please refer to FIG. 8. FIG. 8 shows a block diagram of an Ethernet network system according to an embodiment of the instant disclosure. As shown in FIG. 8, different from the embodiment shown in FIG. 3, the transmission unit 110 further comprises a clock generator 119, the first transmission module 112 comprises a first digital-to-analog converter DA1, the second transmission module 114 comprises a second digital-to-analog converter DA2, the third transmission module 116 comprises a third digital-to-analog converter DA3, and the fourth transmission module 118 comprises a fourth digital-to-analog converter DA4.

The first digital-to-analog converter DA1, the second digital-to-analog converter DA2, the third digital-to-analog converter DA3 and the fourth digital-to-analog converter are electrically connected to the clock generator 119 respectively so as to receive the clock signals CLK1~CLK4. Furthermore, the first digital-to-analog converter DA1 is configured to receive the first digital information signal DIS1 and the first clock signal CLK1, and to transform the first digital information signal DIS1 into the first network data signal NDS1 according to the first clock signal CLK1. The second digital-to-analog converter DA2 is configured to receive the second digital information signal DIS2 and the second clock signal CLK1, and to transform the second digital information signal DIS2 into the second network data signal NDS2 according to the second clock signal CLK2. The third digital-to-analog converter DA3 is configured to receive the third digital information signal DIS3 and the third clock signal CLK2, and to transform the third digital information signal DIS3 into the third network data signal NDS3 according to the third clock signal CLK3. The fourth digital-to-analog converter DA4 is configured to receive the fourth digital information signal DIS4 and the fourth clock signal CLK4, and to transform the fourth digital information signal DIS4 into the fourth network data signal NDS4 according to the fourth clock signal CLK4.

In the following description is further instruction in teaching a work mechanism of the Ethernet network system 800. Before a further instruction, it is clarified that, the system frequency of the Ethernet network system 800 is 125 MHz, and the system signal period is the period of the first common mode signal CMS1, the second common mode signal CMS2, the third common mode signal CMS3 and the fourth common mode signal CMS4, wherein the system signal period is 8 ns.

In conjunction with FIG. 4, FIG. 5 and FIG. 8, when an electronic device (not shown) is connected with the Ethernet network system 800, the clock signals CLK1~CLK4 respectively outputted from the clock generator 119 to the digital-to-analog converters DA1~DA4 sequentially sample the digital information signals DIS1~DIS4 respectively with a time interval therebetween (that is, the delay time such as 2 ns) which is a quarter of the system signal period T. Thus, the digital-to-analog converters DA1~DA4 respectively output the network data signals NDS1~NDS4 with a phase difference of a quarter of the system signal period T between one another (such as 2 ns) (as shown in FIG. 4). In details, delay time between the first clock signal CLK1 and the second clock signal CLK2 is a quarter of the system signal period T, delay time between the second clock signal CLK2 and the third clock signal CLK3 is a quarter of the system signal period T, and delay time between the third clock signal CLK3 and the fourth clock signal CLK4 is a quarter of the system signal period T. It should be noticed that, the clock signals CLK1~CLK4 sequentially sample the digital information signals DIS1~DIS4 respectively with a time interval therebetween (that is, the delay time) which is a quarter of the system signal period T, so phases of the common mode signals CMS1~CMS4 generated from the first channel CH1, the second channel CH2, the third channel CH3 and the fourth channel CH4 would be delayed by a quarter of the system signal period T after another (such as 2 ns), as shown in FIG. 5. Accordingly, time points for transmitting the network data signals NDS1~NDS4 could be staggered in the Ethernet network system 800 of the instant disclosure so as to suppress the frequency spectrum generated by the network data signal via the electric cancellation, such as the odd-numbered frequencies of 125 MHz (125 MHz, 275 MHz, 625 MHz, 875 MHz . . . , etc).

It is worth mentioning that, there are four channels CH1~CH4 taken for example in the Ethernet network systems 100, 200, 300, 600, 700 and 800 in the embodiments shown in FIGS. 1~3 and 6~8; however, in another embodiment, the Ethernet network system could also be a system with two channels instead. Furthermore, the first transmission module is configured to transmit the first network data signal via the first channel, and the first terminal and the second terminal of the primary first inductor are electrically connected to the first transmission module so as to receive the first network data signal. The second transmission module is configured to transmit the second network data signal via the second channel, and the first terminal and the second terminal of the primary second inductor are electrically connected to the second transmission module so as to receive the second network data signal. It should be noticed that, frequencies of the first network data signal and the second network data signal are substantially the same, and there is a predetermined phase difference between the first network data signal and the second network data signal, wherein the predetermined phase difference between the first network data signal and the second network data signal is a half of the period (that is, a half of the system signal period). Thus, the predetermined phase difference between the first network data signal and the second network data signal makes the common mode signals of the first channel and the second channel are mutually canceled. In one embodiment, a center tap of the primary first inductor and a center tap of the primary second inductor are connected with each other.

[One Embodiment of a Method for Cancelling Common Mode Signal]

Figure 9:
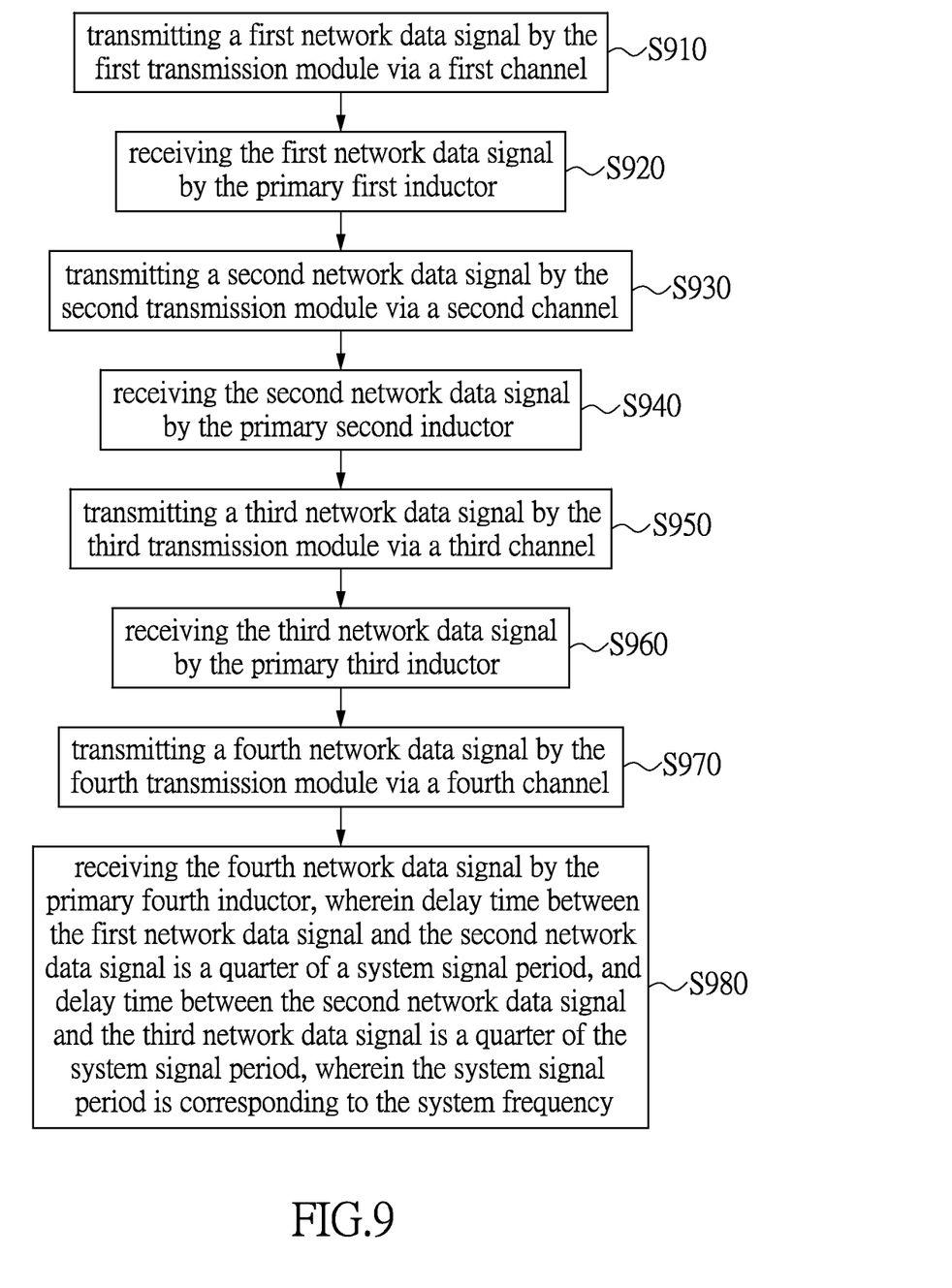
FIG. 9 shows a flow chart of a method for cancelling common mode signal according to an embodiment of the instant disclosure.

Please refer to FIG. 9, FIG. 9 shows a flow chart of a method for cancelling common mode signal according to an embodiment of the instant disclosure. The method of the present embodiment may be conducted in the Ethernet network systems 100, 200, 300, 600, 700 and 800 shown in FIGS. 1~3 and 6~8, and thus please refer to FIGS. 1~3 and 6~8 for further understanding. The method for cancelling common mode signal used in the Ethernet network system comprises steps as follows: transmitting a first network data signal by the first transmission module via a first channel (step S910); receiving the first network data signal by the primary first inductor (step S920); transmitting a second network data signal by the second transmission module via a second channel (step S930); receiving the second network data signal by the primary second inductor (step S940); transmitting a third network data signal by the third transmission module via a third channel (step S950); receiving the third network data signal by the primary third inductor (step S960); transmitting a fourth network data signal by the fourth transmission module via a fourth channel (step S970); and receiving the fourth network data signal by the primary fourth inductor, wherein delay time between the first network data signal and the second network data signal is a quarter of a system signal period, and delay time between the second network data signal and the third network data signal is a quarter of the system signal period, wherein the system signal period is corresponding to the system frequency (step S980).

Relevant details of the steps of the method for cancelling common mode signal regarding the Ethernet network system are described in the embodiments of FIGS. 1~8, and thus it is not repeated thereto.

It is clarified that, a sequence of steps in FIG. 9 is set for a need to instruct easily, and thus the sequence of the steps is not used as a condition in demonstrating the embodiments of the instant disclosure.

To sum up, in the Ethernet network system and the method for cancelling common mode signal provided by the instant disclosure, because the time points of transmitting network data signals are staggered, the spectrum generated in the Ethernet network system is suppressed, such as the odd-numbered frequencies 125 MHz, 375 MHz, 625 MHz, 875 MHz . . . , etc. In other words, delay time between the first network data signal and the second network data signal is a quarter of the system signal period, delay time between the second network data signal and the third network data signal is a quarter of the system signal period, and delay time between the third network data signal and the fourth network data signal is a quarter of the system signal period, which results in a cancellation of common mode signals of the first channel and the third channel, and also results in a cancellation of common mode signals of the second channel and the fourth channel. Moreover, noises in the differential mode signals could be reduced in the Ethernet network system so as to improve the performance and quality of the network data signals in the Ethernet network system.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. An Ethernet network system having a system frequency, the Ethernet network system comprising:
    a first transmission module, configured to transmit a first network data signal via a first channel;
    a primary first inductor, a first terminal and a second terminal of the primary first inductor electrically connected to the first transmission module so as to receive the first network data signal;
    a second transmission module, configured to transmit a second network data signal via a second channel;
    a primary second inductor, a first terminal and a second terminal of the primary second inductor electrically connected to the second transmission module so as to receive the second network data signal;
    a third transmission module, configured to transmit a third network data signal via a third channel;
    a primary third inductor, a first terminal and a second terminal of the primary third inductor electrically connected to the third transmission module so as to receive the third network data signal;
    a fourth transmission module, configured to transmit a fourth network data signal via a fourth channel; and
    a primary fourth inductor, a first terminal and a second terminal of the primary fourth inductor electrically connected to the fourth transmission module so as to receive the fourth network data signal;
    wherein delay time between the first network data signal and the second network data signal is a quarter of a system signal period, delay time between the second network data signal and the third network data signal is a quarter of the system signal period, and delay time between the third network data signal and the fourth network data signal is a quarter of the system signal period; and
    wherein the system signal period is corresponding to the system frequency.

2. The Ethernet network system according to claim 1, wherein phase of a first common mode signal of the first channel and phase of a third common mode signal of the third channel are reversed, and phase of a second common mode signal of the second channel and phase of a fourth common mode signal of the fourth channel are reversed.

3. The Ethernet network system according to claim 1, wherein a center tap of the primary first inductor and a center tap of the primary third inductor are connected with each other, and a center tap of the primary second inductor and a center tap of the primary fourth inductor are connected with each other.

4. The Ethernet network system according to claim 1, wherein a center tap of the primary first inductor and a center tap of the primary second inductor are connected with each other, and a center tap of the primary third inductor and a center tap of the primary fourth inductor are connected with each other.

5. The Ethernet network system according to claim 1, further comprising:
    a secondary first inductor, configured in the first channel so as to receive the first network data signal;
    a secondary second inductor, configured in the second channel so as to receive the second network data signal;
    a secondary third inductor, configured in the third channel so as to receive the third network data signal;
    a secondary fourth inductor, configured in the fourth channel so as to receive the fourth network data signal; and
    a signal port, electrically connected to the secondary first inductor, the secondary second inductor, the secondary third inductor and the secondary fourth inductor respectively via the first, second, third and fourth channels.

6. The Ethernet network system according to claim 5, wherein a center tap of the secondary first inductor and a center tap of the secondary third inductor are connected with each other, and a center tap of the secondary second inductor and a center tap of the secondary fourth inductor are connected with each other.

7. The Ethernet network system according to claim 5, wherein a center tap of the secondary first inductor and a center tap of the secondary second inductor are connected with each other, and a center tap of the secondary third inductor and a center tap of the secondary fourth inductor are connected with each other.

8. The Ethernet network system according to claim 1, wherein the first transmission module comprises:
    a first digital-to-analog converter, receiving a first digital information signal and a first clock signal, and transferring the first digital information signal into the first network data signal according to the first clock signal.

9. The Ethernet network system according to claim 8, wherein the second transmission module comprises:
    a second digital-to-analog converter, receiving a second digital information signal and a second clock signal, and transferring the second digital information signal into the second network data signal according to the second clock signal.

10. The Ethernet network system according to claim 9, wherein the third transmission module comprises:
    a third digital-to-analog converter, receiving a third digital information signal and a third clock signal, and transferring the third digital information signal into the third network data signal according to the third clock signal.

11. The Ethernet network system according to claim 10, wherein the fourth transmission module comprises:
a fourth digital-to-analog converter, receiving a fourth digital information signal and a fourth clock signal, and transferring the fourth digital information signal into the fourth network data signal according to the fourth clock signal.

12. The Ethernet network system according to claim 11, wherein delay time between the first clock signal and the second clock signal is a quarter of the system signal period, delay time between the second clock signal and the third clock signal is a quarter of the system signal period, and delay time between the third clock signal and the fourth clock signal is a quarter of the system signal period.

13. A method for cancelling common mode signal, used in an Ethernet network system, the Ethernet network system having a Ethernet network system and comprising a first transmission module, a primary first inductor, a second transmission module, a primary second inductor, a third transmission module, a primary third inductor, a fourth transmission module and a primary fourth inductor, a first terminal and a second terminal of the primary first inductor electrically connected to the first transmission module, a first terminal and a second terminal of the primary second inductor electrically connected to the second transmission module, a first terminal and a second terminal of the primary third inductor electrically connected to the third transmission module, a first terminal and a second terminal of the primary fourth inductor electrically connected to the fourth transmission module, the method for cancelling common mode signal comprising:
transmitting a first network data signal by the first transmission module via a first channel;
receiving the first network data signal by the primary first inductor;
transmitting a second network data signal by the second transmission module via a second channel;
receiving the second network data signal by the primary second inductor;
transmitting a third network data signal by the third transmission module via a third channel;
receiving the third network data signal by the primary third inductor;
transmitting a fourth network data signal by the fourth transmission module via a fourth channel; and
receiving the fourth network data signal by the primary fourth inductor, wherein delay time between the first network data signal and the second network data signal is a quarter of a system signal period, delay time between the second network data signal and the third network data signal is a quarter of the system signal period, and delay time between the third network data signal and the fourth network data signal is a quarter of the system signal period, wherein the system signal period is corresponding to the system frequency.

14. The method for cancelling common mode signal according to claim 13, wherein phase of a first common mode signal of the first channel and phase of a third common mode signal of the third channel are reversed, and phase of a second common mode signal of the second channel and phase of a fourth common mode signal of the fourth channel are reversed.

15. The method for cancelling common mode signal according to claim 13, wherein a center tap of the primary first inductor and a center tap of the primary third inductor are connected with each other, and a center tap of the primary second inductor and a center tap of the primary fourth inductor are connected with each other.

16. The method for cancelling common mode signal according to claim 13, wherein a center tap of the primary first inductor and a center tap of the primary second inductor are connected with each other, and a center tap of the primary third inductor and a center tap of the primary fourth inductor are connected with each other.

17. An Ethernet network system having a system frequency, the Ethernet network system comprising:
a first transmission module, configured to transmit a first network data signal via a first channel, wherein the first network data signal is a differential signal;
a primary first inductor, a first terminal and a second terminal of the primary first inductor electrically connected to the first transmission module so as to receive the first network data signal;
a second transmission module, configured to transmit a second network data signal via a second channel, wherein the second network data signal is a differential signal; and
a primary second inductor, a first terminal and a second terminal of the primary second inductor electrically connected to the second transmission module so as to receive the second network data signal;
wherein frequencies of the first network data signal and the second network data signal are substantially the same, and the first network data signal and the second network data signal have a predetermined phase difference between to each other;
wherein the first transmission module and the second transmission module are respectively coupled to different channels.

18. The Ethernet network system according to claim 17, wherein a center tap of the primary first inductor and a center tap of the primary second inductor are connected with each other.

19. The Ethernet network system according to claim 17, wherein the predetermined phase difference between the first network data signal and the second network data signal is a half of the system signal period.

20. The Ethernet network system according to claim 17, wherein the predetermined phase difference between the first network data signal and the second network data signal makes common mode signals of the first channel and the second channel mutually canceled.

* * * * *